United States Patent [19]

Daniels, Jr. et al.

[11] 3,853,626

[45] Dec. 10, 1974

[54] METHOD AND APPARATUS FOR MAKING EXPANDED METAL LEAD-ACID BATTERY GRIDS

[75] Inventors: Elon Daniels, Jr., Frankton; Richard H. Kline, Anderson, both of Ind.

[73] Assignee: General Motors Corporation, Detroit, Mich.

[22] Filed: Sept. 20, 1973

[21] Appl. No.: 398,974

[52] U.S. Cl................. 136/36, 136/67, 29/6.1, 72/203
[51] Int. Cl. ............................................. H01m 35/04
[58] Field of Search ........................... 136/36–41, 136/48, 49, 50, 52, 64, 35, 66–67, 26–27, 9; 29/6.1, 6.2, 193.5, 2; 52/670, 672; 72/187, 198, 203, 366, 392

[56] References Cited
UNITED STATES PATENTS

| | | | |
|---|---|---|---|
| 1,482,600 | 2/1924 | Curtis | 29/6.2 |
| 2,275,194 | 3/1942 | Sizelove | 136/36 X |
| 3,099,899 | 8/1963 | Horn et al. | 29/6.1 |
| 3,310,438 | 3/1967 | Huffman et al. | 136/36 |
| 3,621,543 | 11/1971 | Willman et al. | 29/2 |
| 3,702,265 | 11/1972 | Snyder et al. | 136/26 |

Primary Examiner—Anthony Skapars
Attorney, Agent, or Firm—Lawrence B. Plant

[57] ABSTRACT

Method and apparatus for making expanded lead grids for use in Faure-type lead-acid storage battery plates. The finished grid has a current-collecting header of unexpanded strip and a reticulated portion expanded, guillotine style, from the strip into a plurality of paste-retaining cells bounded by skeltal elements and nodes formed during expansion. The skeletal elements and nodes extend in opposite directions through the paste from substantially one face of the plate to the other and the nodes are twisted and partially flattened so as to have plateaus on the nodes which lay in planes parallel to the principal planes of the pasted plate. A ribbon or strip of lead is fed into a continuous, in-line, guillotine-type, dual expansion machine and therein expanded along its longitudinal edges to form two reticulated portions and leaving a central unexpanded portion from which a grid, header and lug are subsequently formed. The strip leaving the expanded has a V-shape or gull-winged configuration when viewed from its end, the wings of which are subsequently folded down by plow and roller means so as to be in substantially the same plane as the unexpanded portion. The reticulated portions are subsequently uniformly stretched in a direction perpendicular to the central portion by embossed forming rolls and mating counter rolls. Finally, the reticulated portion is rolled to twist and flatten the nodes joining skeletal elements. Water lubrication of the expanding dies promotes oxidation of the reticulated portion which in turn tends to enhance paste retention.

5 Claims, 17 Drawing Figures

METHOD AND APPARATUS FOR MAKING EXPANDED METAL LEAD-ACID BATTERY GRIDS

Commercial automotive lead-acid storage battery plates have heretofore been largely made by casting techniques in which a pair of interconnected grids are cast in a single mold using lead alloys containing about 3 –7% antimony to improve the castability of the lead. The grid pairs are subequently handled as a discrete unit through pasting and a number of the remaining processing operations. Casting of the grids in this manner is slow, requires skilled labor working in a hot environment, and the plates made therefrom are subsequently subjected to considerable rough in-plant handling. Moreover the antimony needed for castability produces undersirable side effects in the finished battery. It has been proposed to make plates by expanding, guillotine fashion, strip of sheet lead alloy in successive advances between slitting and stretching dies such that short interconnected skeletal segments are peeled away from the leading edge of the strip to form a tiered structure of polygonal paste-retaining cells. Despite the potential advantages, this technique has not been substantially used in the manufacture of lead-acid batteries.

The present invention relates to a highly commercially acceptable process and apparatus for continuously making expanded lead grids for a lead-acid storage battery from a narrow sheet or strip of lead utilizing a modified in-line, dual expansion guillotine process and the grid produced is satisfactory for commercial manufacture and customer use. The grids made by this invention are useful with both positive and negative plates and accordingly by the term "leady" active materials is meant the lead, lead oxide and lead sulfate forms conventionally found in lead-acid batteries. Similarly, the term "lead" sheet is intended to include not only pure lead but also those typical lead alloys found in conventional lead-acid battery grids, especially the non-antimonial lead alloys and particularly the lead calcium alloys.

The grid produced by this invention comprises a skeleton of expanded sheet lead having an unexpanded, current-collecting top header portion and an expanded reticulated portion depending from the header. The reticulated portion includes a plurality of thin wire-like skeletal elements emanating from nodes which interconnect the several skeletal elements and are substantially thicker than the skeletal elements. Each node angles through the paste at an angle nearly normal to the plane of the plate. Each node has a thickness which is greater than the thickness of the original sheet lead from which it was derived, is subsstantially less than twice the thickness of that sheet lead, and has flat surfaces or plateaus laying in the principal planes of this grid. More particularly, after the expansion step, the grid is conditioned so as to angularly orient the node by rotating it slightly and concurrently flatten those salient edges of the node which, by virtue of the node rotation, would otherwise project from the opposed faces of the grid. The flattening of the salient edges of the nodes changes the substantially rectangular vertically transverse cross-section of the as-expanded node to a polygonal cross-section having two opposed, substantially parallel sides which lay in the principal planes (i.e., the faces) of the grid, and are spaced apart from the other by a distance greater than the thickness of the header sheet but less than twice that thickness. The skeletal elements diverge from each node so as to angle from one face of the grid to the other, but in opposite directions to the nodes from which they emanate so as to provide support for the subsequently applied paste over substantially the entire thickness of the pasted plate. The opposite angling of the nodes and skeletal elements insures continuity of the paste between adjacent, paste-retaining, polygonal cells.

It is an object of the present invention to provide a process and apparatus for economically continuously producing such grids over a wide range of lead alloys and metal contents and a process and apparatus which does so at very high production rates without being so harsh as to deleteriously affect the reticulated portion produced during expansion.

More specifically, it is an object of this invention to economically produce expanded lead grids suitable for Faure-type lead-acid storage battery plates by a continuous, in-line, guillotine-type, dual expansion in which: a narrow lead strip or ribbon of lead having a central header/lug-forming portion and flanking grid-forming portions extending therefrom to the longitudinal edges of the strip is advanced longitudinally between two rows of progressive, reciprocating dies which converge in incremental steps on the center of the strip, expanding the grid forming portions into reticulated gridworks extending at acute angles from the plane of the central portion; gently folding the reticulated gridworks substantially back into the plane of the central portion; uniformly stretching the gridworks in opposite directions away from the central portion and substantially perpendicular to the direction of advance of the strip through the dies; flattening the reticulated portions to a thickness greater than the central portion, but significantly less than twice the thickness thereof; continuously pasting the strip; forming headers and lugs from the center portion; and segmenting the strip into individual battery plates.

These and other objects and advantages will be more readily apparent from the detailed description which follows in which.

A preferred form of grid made in accordance with this invention is expanded guillotine-style from both longitudinal edges of a ribbon of lead strip so as to have a current-collecting header 4 and lug 6 of unexpanded sheet and a reticulated paste-supporting portion 12 expanded from the sheet into a plurality of polygonal paste-retaining cells 16 depending from the header. The paste-retaining cells are defined by wire-like skeletal elements 8 connected one to the other by oriented, cross-sectionally (i.e., vertically transverse) polygonal nodes 10, each node having at least two substantially parallel flat plateaus 22 laying in the principal faces of the grids. The plateaus 22 are spaced from each other by a distance at least about 1.3 times the thickness of the lead sheet from which the reticulated portion 12 was expanded and the header 4 formed. Both the skeletal elements 8 and nodes 10 extend diagonally through the thickness of the plate, but in respectively opposite directions as in Z-fashion, thereby providing continuity between the paste from one cell to the next and enhancing paste retention to the grid.

In general, the grids thus described are initially expanded from strips of lead by an in-line, guillotine-type, dual expansion process like that disclosed in Curtis U.S. Pat. No. 1,482,600. In such a process, cross-sectionally rectangular, wire-like segments are sheared and stretched from a ribbon of metal with reciprocating slitting and expanding cutters, the ribbon being fed step by step to the cutters lengthwise thereof parallel with the cutters and the side margins of the ribbon. As a result, a plurality of undulatory skeletal element tiers are formed from each longitudinal edge of the ribbon advancing between the rows of progressive, reciprocating dies which converge on the center of the strip in the direction the strip is advanced. The expanded (i.e., reticulated) portions extend like wings at an acute angle to the lead strip of ribbon from which they are punched. The several tiers are connected to the next adjacent tiers via nodes 10 which comprise unslit and unstretched portions of the sheet intermediate the skeletal elements of each tier, the said nodes being about twice the width of the skeletal elements joining to form the node. The skeletal elements intermediate the nodes comprise portions of the strip's edges which have been peeled away therefrom and strected to at least about 1.2 times their original length. Lead sheets useful with this technique vary in thickness from about 0.035 to about 0.05 inch. The thinnner sheets are used primarily in negative plates and the thicker sheets in positive plates. The width of the skeletal elements can also vary considerably (i.e., between about 0.025 inch and about 0.08 inch). Skeletal element cross-sectional areas of at least about 0.0012 sq. in. are considered necessary for very open negative grids while considerably thicker elements are needed for positive grids, especially near the header, for conductivity and corrosion-resistance reasons.

Figure 9:
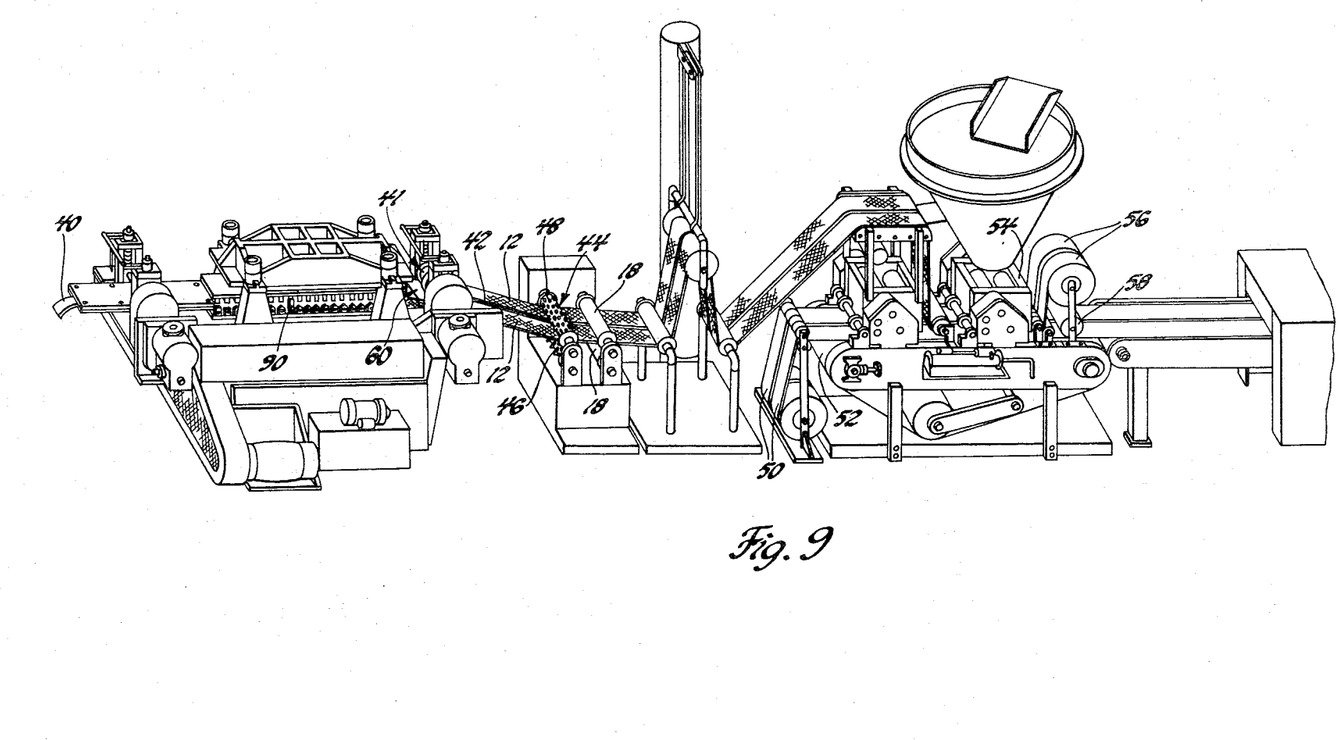
FIG. 9 is a perspective view illustrating apparatus for continuously making grids according to this invention.
Figure 10:
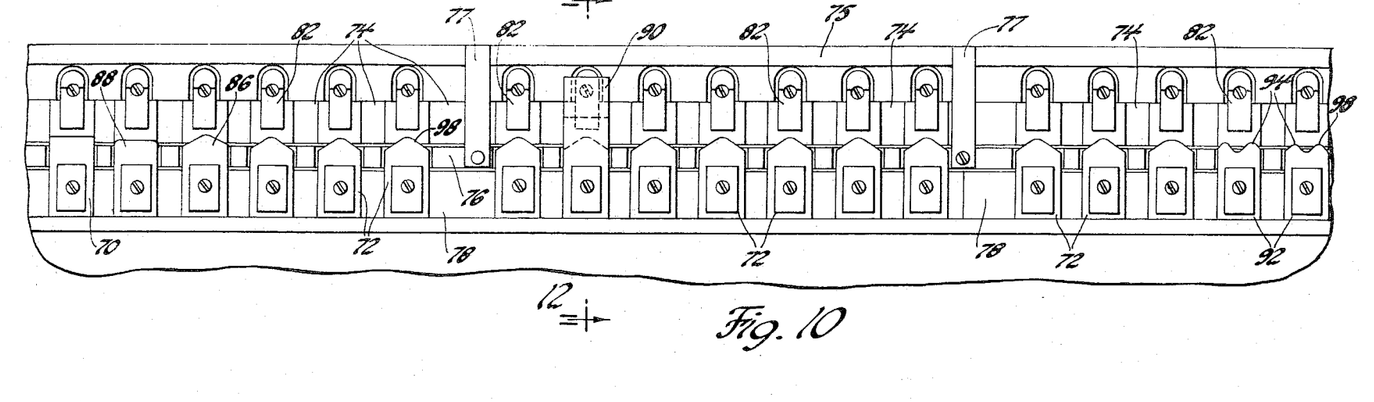
FIG. 10 is an enlarged side elevational view of the expanding dies of the expander portion of the apparatus shown in FIG. 9.
Figure 11:
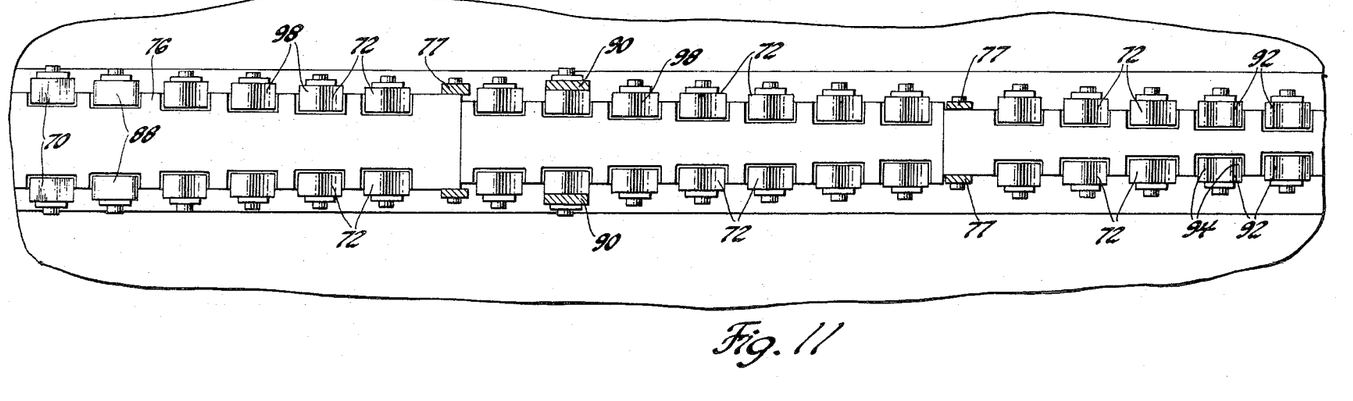
FIG. 11 is an enlarged plan view of the expander portion of the apparatus shown in FIG. 9.
Figure 12:
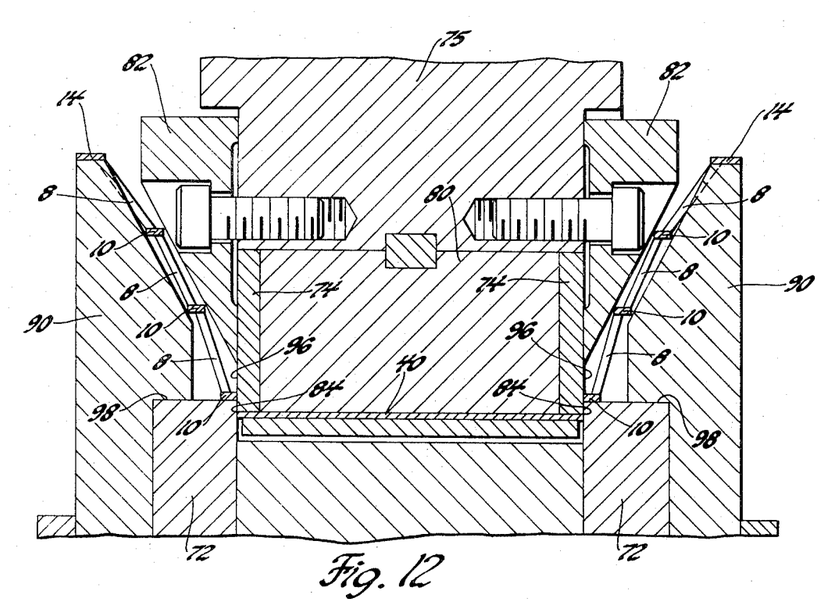
FIG. 12 is a sectional view taken along the line 12—12 through the die set and border straightener shown in side elevation in FIG. 10.

The process is initiated by feeding a thin, narrow ribbon of lead 40 into the continuous, in-line, dual-expansion, guillotine-type expander illustrated at the left of FIG. 9. FIGS. 10 – 12 show the expander in more detail and will be used to briefly describe the expansion that occurs therein. FIG. 10 is a side view showing basically the reciprocating dies 72, fixed position cutters 74 and the bed or stripper plate 76 on which the ribbon 40 slides as it advances through the expander. FIG. 11 is a plan view of the stripper plate 76 also showing the top faces 98 of the reciprocating dies 72 which move up and down through notches in the stripper plate 76. FIG. 12 shows a sectional view taken alone the line 12—12 of FIG. 10 and includes a section through the expanded grid (not shown in FIG. 10). More specifically and moving from left to right on FIGS. 10 and 11, the moving strip 40 first engages guides 70 which align the strip 40 with the center line of the gauntlet dies 72 and cutters 74 ahead. The guides 70 reciprocate in unison with the dies 72 since all are fixed to a common die holder 78 which is driven up and down by an appropriate means (not shown). The ribbon 40 rides atop a bed or stripper plate 76 which is fixed to the cutter-holder assembly 75 (though spaced therefrom) by means of straps 77 whereby the expanded portions are stripped from the dies 72 during the downward motion thereof. The cutters 74 are held tightly in position against the stationary block 80 by means of retainers 82 as best shown in FIG. 12, and the cutting and breaking action that occurs is accomplished by the sharp edges 84 of the cutters 74 when the reciprocating dies 72 push the longitudinal edges of the strip 40 up against the cutters and thereby peel portions of the edge away from the strip 40.

The dies 72 are so shaped at their top 86 as to cause both slitting and stretching of the lead peeled away from the edges of the strip 40. While a variety of shapes can be used for the top of the dies to effect the stretching, the semidiamond shape shown is preferred. Each upward motion of the dies 72 forms one-half of a paste-retaining cell 16 with the remainder of the cell being formed downstream of that die during the formation of the next adjacent tier of skeletal elements 8.

When a lower border 14 (FIG. 1) is desired on the grid the first increment of metal cut from the edge is only slit but not stretched appreciably. First flat-topped dies 88 are provided after the guides 70 for this purpose. with grids so made, the bottom border 14 causes a greater tendency for the reticulated portion to curl and jam up in the expander before reaching the end thereof. To overcome this problem, a border straightener 90 is provided on one set of opposing dies 72 about midway the gauntlet of dies. The height of the straightener is adjusted to engage the bottom border 14 and force it upwardly thereby pulling out any deleterious curl developed in the reticulated portion at that stage of the expansion (see FIG. 12).

Figure 6:
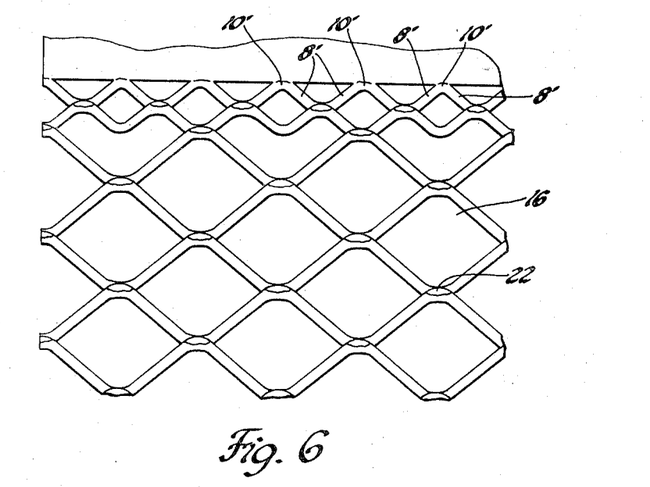
FIG. 6 is a front elevational view of the upper portion of another embodiment of an expanded lead sheet grid made in accordance with the present invention.

For negative grids having the extra nodes 10' and skeletal elements 8' such as shown in FIG. 6 and discussed in U.S. Pat. application McCartney et al. Ser. No. 399,109 filed Sept. 20, 1973 and assigned to the assignee of the present invention, the dies 92 near the end of the gauntlet include two diamond-shaped upper edges 94, as best seen in FIG. 10. These double diamonds form two half-cells per each stroke of the dies 92 in the same space as a die 72 forms a single cell 16. Using this technique of expansion, grids can be made having a variety of shapes and cell densities (e.g., cells per sq. in. of the grid) by merely changing the face and/or shape of the upper edge of all or only some of the reciprocating dies 72, as was done with end dies 92.

Expanders of this general type have been used heretofore to make metal lathe for the building industry and, in fact, the machine used here is a modified version of one such machine made by Urbana Tool. The earlier lathe-making machines have universally used carbide dies 72 and cutters 74, but were incapable of expanding lead into battery grids. Attempts to expand lead sheet in this manner proved disasterous as, no matter what adjustments were made, substantially all of the lead was ripped and torn rather than cleanly cut and stretched as was required. The lead had clung to the lateral faces 96 of the cutters 74 and top face 98 of the dies 72 and 92 allowing no slippage. The carbide cutters/dies were replaced with hardened tool steel (e.g., D-2 air hardening tool steel). The lateral faces 96 of the cutters 74 were machined so as to have the machining marks running up and down in the same direction that the reciprocating dies 72 move and needed no further work. After machining, the surfaces 98 of the dies 72/92 were buffed using No. 60 grit lapping compound to smooth the surface 98 sufficiently to permit the skeletal elements and nodes of soft lead to slide over the surface during stretching rather than cling to it causing the breakage. The surfaces 96 of the cutters 74 may also be buffed, but this is not necessary when the machining marks are in the direction indicated which does not produce enough drag on the sliding skeletal elements to cause breakage. While the amount of breakage was significantly reduced by this change, the level of breakage was still undesireably high.

In this regard, the dies and cutters were being lubricated with oil or silicone-based lubricants as had traditionally been done with the lathe-making machines and changing the clearances between the dies and cutters did not seem to improve the situation. It was then unexpectedly found that by eliminating the oil and silicone lubricants and spraying the dies and cutters with ordinary tap water, not only was it possible to produce reticulated portions having less than 30% of the skeletal elements broken, but the surface of the expanded lead was improved. With this discovery an adjustment of the die-cutter clearance to about 0.0015 inch yielded reticulated portions acceptable for use as battery grids (i.e., less than 10% breakage) at production rates of about 50 feet per minute. Even more surprising was the discovery that water could still be used as the lubricant at production rates of around 180 feet per minute by merely increasing the die-cutter clearance to about 0.0025 inch and when this was done there was substantially no breakage at all. With water as the lubricant there was no longer a need to wash the oil/silicone from the surface of the grid before pasting which contributed significantly to the economies of this process. In this regard, the oil/silicone film is left on the grid, which film prevents the paste from adhering sufficiently to the grid, and increases the internal resistance of the grid somewhat. Bathing the dies, cutters and grids in water, however, not only provides the needed lubrication, but promotes oxidation of lead surface in the expander which actually improves adhesion of the paste to the grid. Hence, a fourfold benefit, unique to the making of battery grids, is achieved with the use of water here, i.e., improved high-speed lubrication, elimination of washing step, reduced lubricant costs, and an oxidized lead surface is produced all in a single operation.

Figure 13:
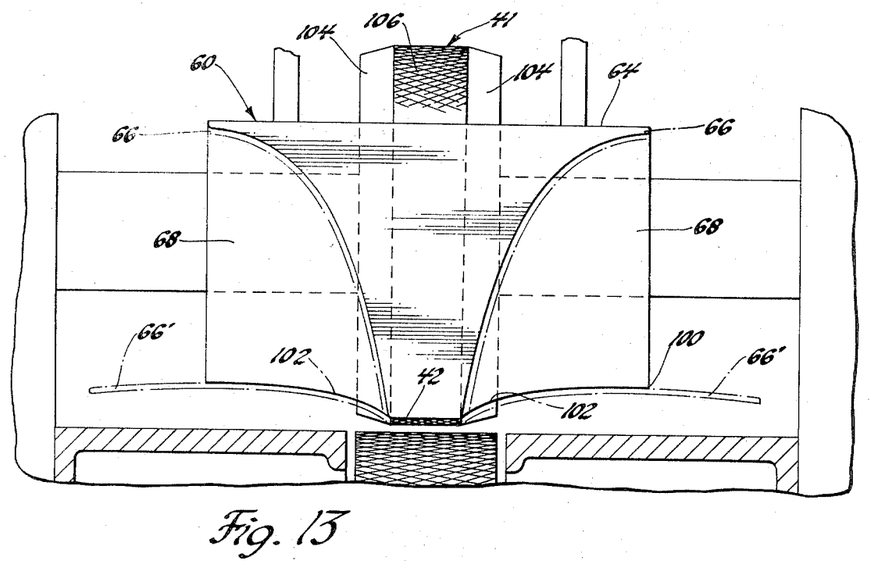
FIG. 13 is an enlarged front elevational view of the input end of the plow and leveling roller portion of the apparatus shown in FIG. 9.
Figure 14:
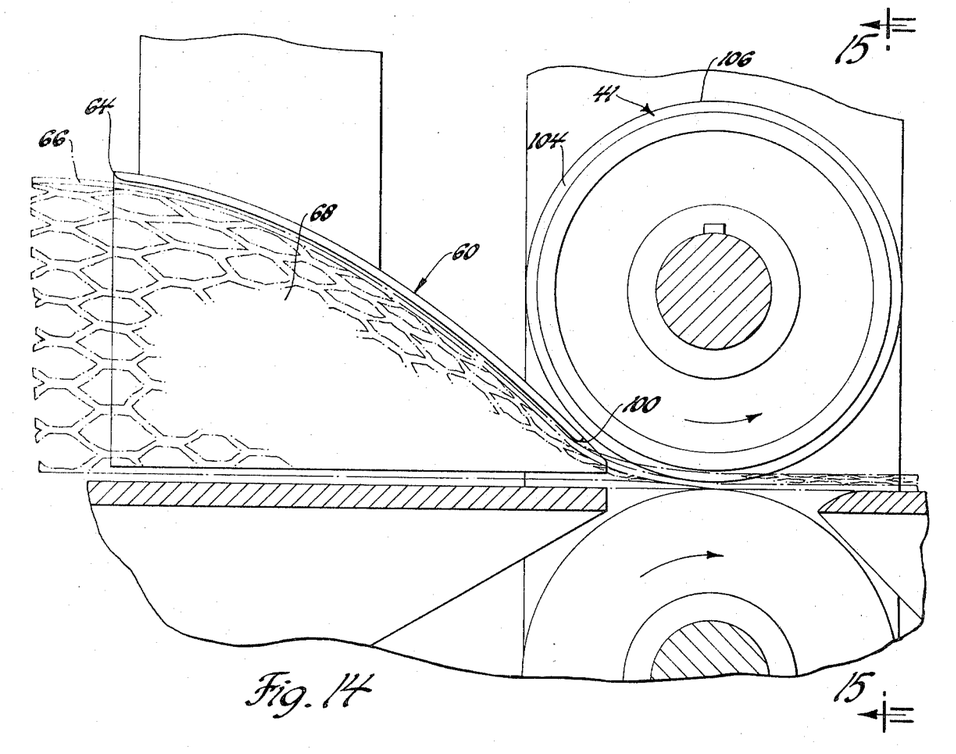
FIG. 14 is an enlarged side elevational view of the plow and leveling roller portion of the apparatus shown in FIG. 9.
Figure 15:
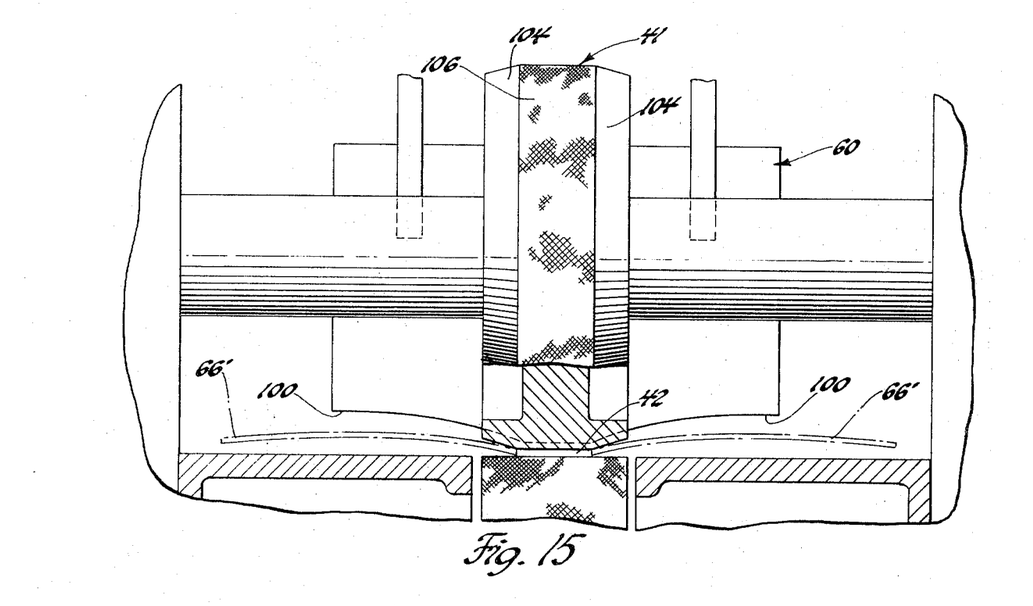
FIG. 15 is a transverse sectional view through the leveling roller taken in the direction of line 15—15 of FIG. 14.

Following expansion, and without substantially affecting the nodes, the reticulated portions are gradually laid down into substantially the same plane as the lead strip from which it was punched by advancing the expanded wings of the V-shaped strip beneath a plow 60 and beveled leveling roller 41, best shown in FIGS. 13 - 15. In this regard, FIG. 13 views the plow (and background leveling roller 41) from its inlet side 64 and shows in phantom the general configuration of winged strip 66 as it enters the plow 60. FIG. 14 shows a side elevation of the leveling system, plow and roller, while FIG. 15 shows a transverse section through the rollers, showing the curved surfaces 68 gently folding the reticulated wings 66' to a position more nearly coplanar with the center portion 42 on the exit end 100 of the plow. At this point, a slight hump 102 remains near where the wings join the center portion, which hump is substantially leveled out by subsequent engagement with the beveled (i.e., about 15°) portions 104 of the leveling and drive roller 41 (see FIG. 15). The cylindrical center portion 106 of the beveled roller 41 and outer surface of its coacting drive roller are knurled to firmly grab the center of the strip and drive it through the system. After plowing and leveling, the nodes 10 lay at a slight angle (i.e., about 2°-4°) to the plane of the unexpanded strip remaining in the center.

Figure 16:
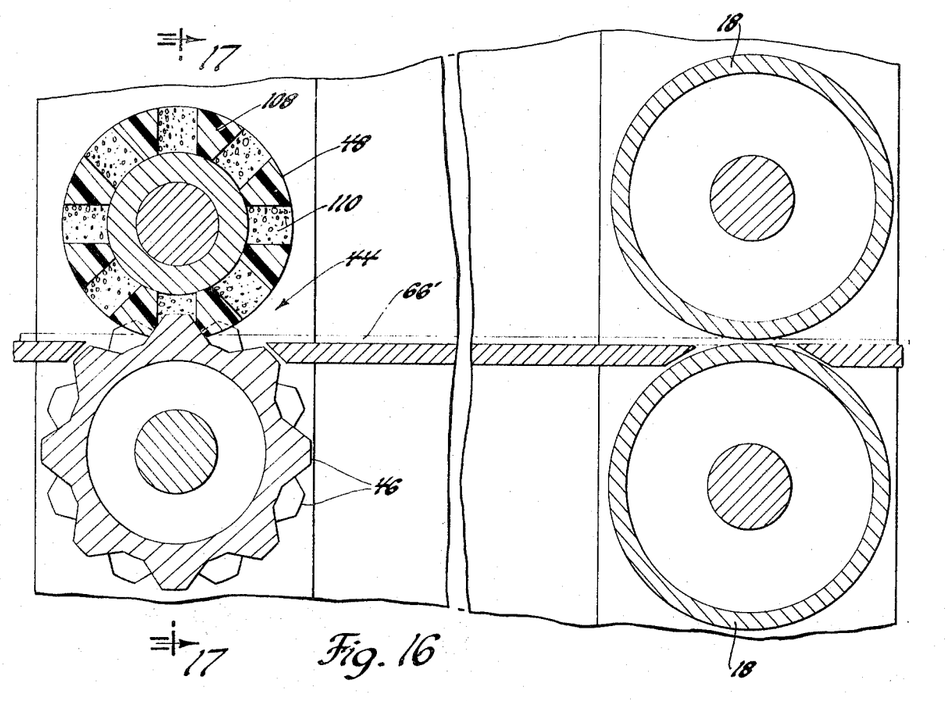
FIG. 16 is an enlarged side elevational view of the stretching and flattening rollers illustrated in FIG. 9.
Figure 17:
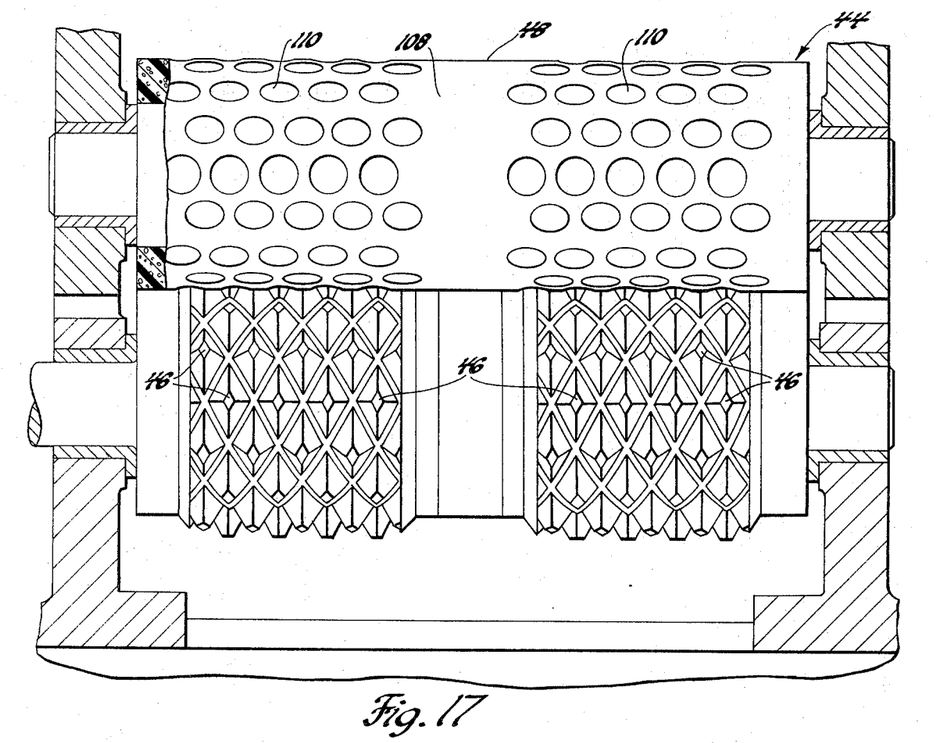
FIG. 17 is an enlarged front elevational view of the stretching rollers as seen in the direction 17—17 of FIG. 16.

Following the leveling operation, the reticulated portions are uniformly stretched by engaging each tier and pulling it in a direction directly away from the header. This stretching action slightly rotates the nodes 10 and makes the paste-retaining cell more equiaxed by elongating the minor axis of the cell (i.e., perpendicular to the header) and shortening the major axis of the cell (i.e., parallel to the header). For negative plates having large cell areas in proportion to grid metal, a minor to major axis ratio of at least about 0.7 is preferred, while for positive plates having smaller cells and more grid metal, a minor to major axis ratio of at least about 0.9 is preferred to assist in reducing vertical grid growth. As a result of this stretching, the total reticulated portion is extended by an amount equal to the summation of the increase in length of the minor axes of the cells in each of the several tiers making up the grid. This stretching is accomplished by feeding the level strip between a pair of forming rollers 44 (best shown in FIG. 16 and 17), which stretch the reticulated portions in a direction about 90° from the unexpanded central portion. The forming rollers 44 include an embossed lower roller having a plurality of truncated pyramidal projections 46 which engage each of the cells of the reticulated portion. The opposing upper roller 48 is closely spaced from the lower roller and has a thick compressible polyurethane layer 108 including a plurality of holes 110 adapted to receive the projections 46. The polyurethane between the holes engages the skeletal elements and nodes forcing them downward toward the wide bases of the projections 46 to form each cell individually around the base of a projection 46 and thereby uniformly stretch the reticulated portions to the desired size.

Following stretching, the reticulated portions 12 are next passed through a set of rollers 18 in the direction of the major axis or, in other words, in a direction 90° to the direction of expansion. The rollers 18 comprise 6150 steel having a hardness of $R_c$ 48 – 52 and are spaced apart at least about 1.3 times the thickness of the lead strip. As a result, passing between the rollers causes still further rotation of the nodes to between about 6° and 15° and concurrently flatten into plateaus the outwardly projecting or salient edges of the nodes which had rotated to the outward faces of the grid. Adjustment of the spacing between the rolls controls the ultimate grid thickness which can be readily changed as the thickness of the strip or width of the cut changes. Regardless, the otherwise substantially rectangular cross-section of an as-expanded node 10 is changed to a polygonal cross-section (see FIG. 5) in which the flattened portions or plateaus 22 of the nodes 10 lay in the principal faces of the grid and are spaced from each other by a distance at least about 1.3 times, but substantially less than two times, the thickness of the header sheet 4. By this twisting and flattening, each node is significantly mechanically worked causing some flow and bulging of the node, but in a manner which is not so severe or harsh as to significantly damage the reticulated portion and shorten the useful life of plates made therefrom.

Following flattening, the laterally expanded strips are continuously pasted by laying them on top of strips of perforated paper 50 (e.g., see Adams U.S. Pat. No. 3,758,340 issued Sept. 11, 1973 ) on a continuous belt 52, passing it under a paste dispensing apparatus 54 adapted to press the paste around the skeletal elements from one side of the grid, covering it with a second layer of paper 56, rolling it to a desired thickness (see rollers 58), drying the paste, forming (not shown) the headers and lugs from the center portion, separating the two pasted strips and finally segmenting each strip into individual plates. Forming of the headers and lugs from the center portion can be accomplished almost anywhere in the system, even before the expanders, if desired.

Figure 1:
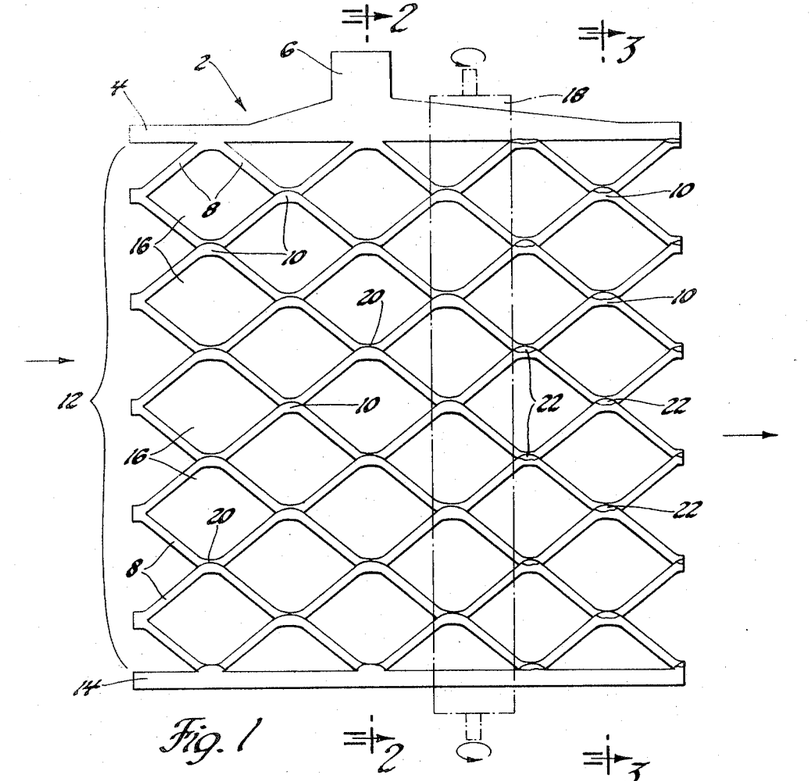
FIG. 1 is a front elevational view of a discrete expanded lead sheet grid made by the process and apparatus of the present invention.
Figure 2:
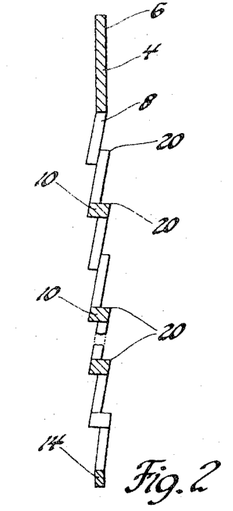
FIG. 2 is a side view in the direction 2—2 vertically transverse the grid of FIG. 1, before node flattening.
Figure 3:
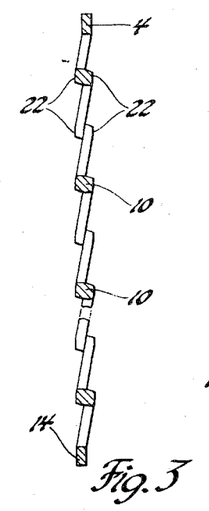
FIG. 3 is a side view in the direction 3—3 vertically transverse the grid of FIG. 1, after node flattening.
Figure 4:
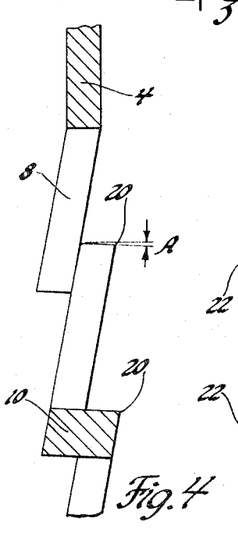
FIG. 4 is an enlargement of the uppermost portion of FIG. 2.
Figures 4, 5:
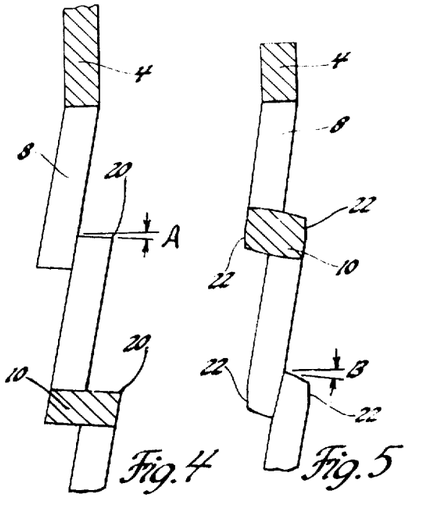
FIG. 5 is an enlargement of the uppermost portion of FIG. 3.
Figure 5:
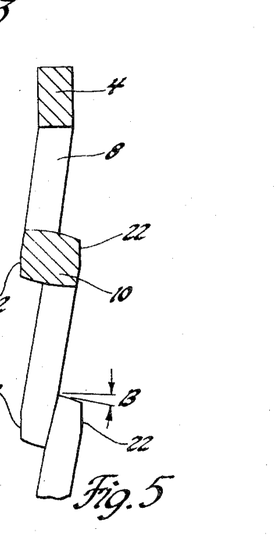

A better understanding of the grids and plates resulting from this invention can be obtained by reference to the drawings, FIGS. 1 – 8, and U.S. Pat. application Wheadon et al. Ser. No. 398,975 filed Sept. 20, 1973 and assigned to the assignee of the present invention. In this regard, FIG. 1 shows grid blank 2 comprising a header 4 having a lug 6. The single grid blank shown has previously been expanded, leveled, and stretched as described above. As indicated, these operations are carried out on continuous strips expanded in opposite directions from the longitudinal edges of the strip and the single grids then cut from the strip. FIG. 1 then serves best here only to illustrate what occurs to the leveled and stretched reticulated portions as they pass between the flattening rollers 18. A plurality of skeletal elements 8 and nodes 10 depend from the header 4 making up the reticulated portion of the grid generally indicated at 12. A bottom border 14 may be provided to prevent warpage of the grid-making strips during the expansion process and to support the plate on the bridges at the bottom of the battery case. The skeletal elements 8 and nodes 10 making up the reticulated portion 12 define a plurality of polygonal paste-retaining cells 16. The already expanded and stretched grid blank 2 is depicted as moving from left to right between compression rollers 18 (top roller shown in phantom), which mechanically work the nodes 10 rotating them about an axis parallel to the header 4 and flattening the salient upstanding edges 20 of the as-expanded grid to form plateaus 22 on the as-rolled grid. In this regard, FIGS. 2 and 4 depict the as-expanded grid blank 2 prior to rolling and shows the salient edges 20 of the nodes 10 and the slight angle A that the node 19 bears to the principal planes of the grid blank 2. FIGS. 3 and 5 depict the grid blank 2 after rolling and shows the increased angle B resulting from the rotation of the node as well as the flattening of the edges 20 into plateaus 22. Hence, what was initially a substantially cross-sectionally rectangular node 10 prior to rolling is transformed, after rolling, into a cross-sectionally polygonal node by the addition of two sides which are the parallel plateaus 22. In addition, the working of the node 10 causes it to bulge or round a bit as best shown in FIG. 5. The overall affect of the rolling then rotates the nodes, works the metal thereof and provides two opposed plateaus 22 which are separated one from the other by a distance which exceeds the thickness of the header 4 but is substantially less than twice that thickness. The distance between the plateaus formed during rolling fixes the thickness of the grid and the principal planes of the grid are those planes which include the plateaus 22. Flush pasted grids will be pasted to this thickness, i.e., between the plateaus 22 (see FIG. 7), while over pasted plates (not shown) will have the paste extending somewhat beyond the principal planes of the grid.

FIG. 6 depicts an expanded lead grid which is intended for use in negative plates and is discussed in more detail in copending U.S. Pat. application Ser. No. 399,109 filed Sept. 20, 1973 in the names of McCartney et al. and assigned to the assignee of the present invention.

Figure 7:
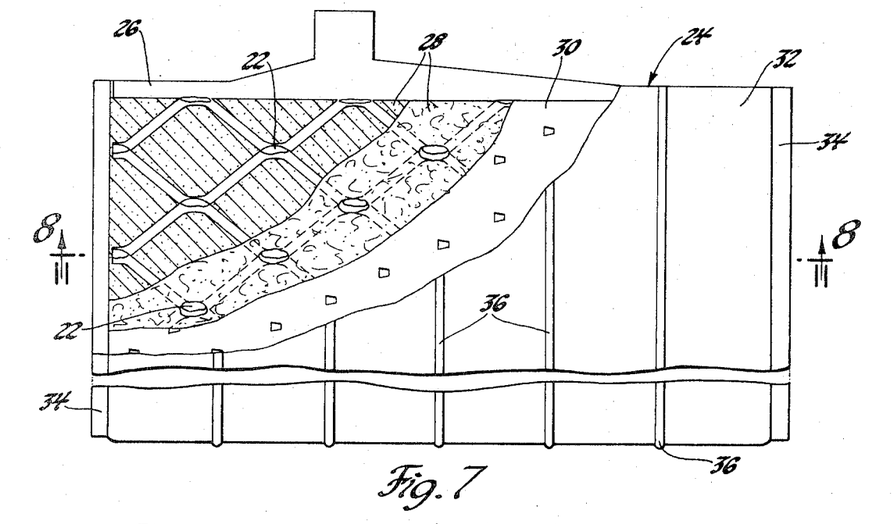
FIG. 7 is a partially broken-away front elevational view of a separator-encapsulated, paper-bound, battery plate having a grid made in accordance with the present invention.
Figure 8:
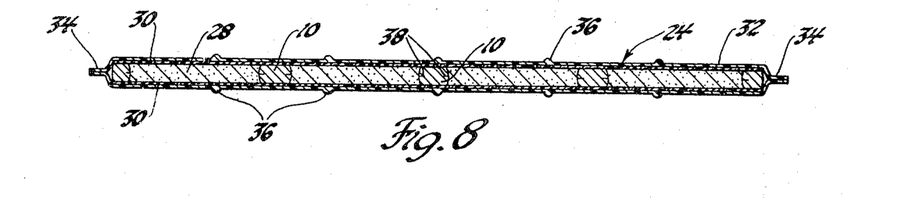
FIG. 8 is a bottom view in the direction 8—8 of FIG. 7.

FIGS. 7 and 8 depict a unit assembly 24 including a grid 26 made by this invention embedded in a fiber-laden (e.g., Dynel, polypropylene, etc.) paste 28. This grid 26 is shown as being flush-pasted but an over-pasted grid is possible and, in fact, preferred for automotive battery applications. The paper-bound pasted grid is enclosed in a conventional battery separator 32 (e.g., sintered polyvinyl chloride). This is most conveniently accomplished by folding the separator around the bottom of the pasted grid 26 and heat sealing the lateral edges 34 thereof. Spacing ribs 36 on the outside of the separator 32 provide space between the assembly 24 and the negative plate to permit a more efficient circultaion of the electrolyte through the cell group. FIG. 8 also depicts the small fracture 38 which usually forms extends into the nodes 10 during the expansion process and which, if severely extended during processing of the grid, can cause premature failure of the plate in use.

In a specific example of the invention, negative grids were made by upwardly expanding a 2.38 inch wide, 0.04 inch thick ribbon 40 of lead-calcium-tin alloy (0.065% Ca, 0.7% Sn). The ribbon 40 was expanded from both longitudinal edges so as to produce two expanded, reticulated portions or wings 66 joined by a common unexpanded portion 42. Skeletal elements having a width of 0.05 inch were punched and stretched (i.e., about 1.2 times) from the ribbon and were joined by nodes having a width of 0.1 inch. Ten tiers of skeletal elements and a bottom border were provided so as to yield a grid having 34 cells per 5 × 5 ½ inch reticulated portion. After expansion the grid strip was passed beneath a pair of plows 60 which gently folded the winged reticulated portion down to a position more nearly in the plane of the unexpanded center portion but with a slight hump where the reticulated portion joined the unexpanded portion. A beveled (15°) roll 41 substantially completed the leveling out of the hump. The strip was next passed between a pair of stretching/forming rollers 44 which stretched the reticulated portions in a direction 90° from the unexpanded portion and increased this dimension of the reticulated portions each by about one-fourth inch. From the stretching/forming rolls, the grid strip passed between flattening rolls 18, discussed above, where the slightly canted nodes were rotated and their salient edges flattened into plateaus which were 0.055 inch apart. Hence, an overall node reduction from about 0.1 inch to about 0.055 inch was effected.

While this invention has been disclosed in terms of specific embodiments thereof, it is not intended that it be limited thereto, but rather only to the extent set forth hereafter in the claims which follow.

It is claimed:

1. A method of making lead-acid storage battery plates comprising:
    advancing a narrow lead strip, having a predetermined thickness, longitudinally between two rows of progressive dies and cutters, said strip having a central, longitudinal lug-forming portion and two expandable grid-forming portions flanking the lug-forming portion and extending to both longitudinal edges of the strip, and said rows comprising a plurality of dies and cutters which converge in incremental steps on the central lug-forming portion of the strip passing between them;
    expanding the grid-forming portions along the longitudinal edges thereof by periodically shearing rectangular wire-like segments from said edges into a plurality of tiers of undulatory skeletal elements extending at acute angles to the plane of said lug-forming portions and such that successive tiers are offset one from the other and joined one to the other by a plurality of nodes which join the ends of successive segments in one tier to the centers of like segments in successive tiers, said nodes having rectangular, vertically transverse cross-sections and widths significantly greater than said predetermined thickness and equal to the sum of the widths of the adjoining skeletal elements, whereby two reticulated portions comprising a plurality of polygonal paste-retaining cells bounded by said skeletal elements and nodes are formed and extend at acute angles from the central portion in gull-wing fashion when viewed head-on;
    leveling the thusly expanded strip by folding said reticulated portions down into nearly the same plane as said central portion;
    uniformly stretching the reticulated portions in directions substantially perpendicular to the direction the strip is fed through the dies by urging each tier of skeletal elements in those directions independently of the other tiers to uniformly size the cells, stretch the reticulated portions to a predetermined width and slightly rotate the rectangular nodes such that diagonally opposing edges of the nodes become salient in the principal planes of the reticulated portions;
    flattening the reticulated portions by further rotating said nodes and compressing said salient edges into plateaus and thereby convert the rectangular cross-sections of said nodes to polygonal cross-sections having two opposing sides thereof laying in planes substantially parallel to the faces of the pasted plate and spaced one from the other by a distance greater than said predetermined thickness but substantially less than twice said predetermined thickness;
    substantiallly engulfing the reticulated portions in a leady acitve material paste and sandwiching same between strips of paper which are substantially co-extensive with said reticulated portions;
    drying the paper-bound pasted strip; and
    finally segmenting the pasted strip into individual battery plates.

2. A method of making lead-acid storage battery plates comprising:
    advancing a narrow lead strip having a predetermined thickness longitudinally between two rows of progressive dies and cutters, said strip having a central, longitudinal lug-forming portion and two expandable grid-forming portions flanking the lug-forming portion and extending to both longitudinal edges of the strip, and said rows comprising a plurality of dies and cutters which converge in incremental steps on the central lug-forming portion of the strip passing between them;
    expanding the grid-forming portions along the longitudinal edges thereof by periodically shearing rectangular wire-like segments from said edges and stretching said segments to about 1.2 times their original length into a plurality of tiers of undulatory skeletal elements extending at acute angles to the plane of said lug-forming portions and such that successive tiers are offset one from the other and joined one to the other by a plurality of nodes which join the ends of successive segments in one tier to the centers of like segments in successive tiers, said node having rectangular, vertically transverse cross-sections and widths significantly greater than said predetermined thickness and equal to the sum of the widths of the adjoining skeletal elements, whereby two reticulated portions comprising a plurality of polygonal paste-retaining cells bounded by said skeletal elements and nodes are formed and extend at acute angles from the central portion in gull-wing fashion when viewed head-on;
    plowing said reticulated portions down into a position more nearly in the same plane as said central portion, but with a residual hump near where the reticulated portion joins the central portion;
    rolling out said hump so as to bring said reticulated portions into nearly the same plane as said central portion;
    uniformly stretching the reticulated portions in directions substantially perpendicular to the direction the strip is fed through the dies by urging each tier of skeletal elements in those directions independently of the other tiers to uniformly size the cells, stretch the reticulated portions to a predetermined width and slightly rotate the rectangular nodes such that diagonally opposed edges of the nodes become salient in the principal planes of the reticulated portions;

flattening the reticulated portions by further rotating said nodes and compressing said salient edges into plateaus and thereby convert the rectangular cross-sections of said nodes to polygonal cross-sections having two opposing sides thereof laying in planes substanntially parallel to the faces of the pasted plate and spaced one from the other by distance greater than said predetermined thickness but substantially less than twice said predetermined thickness;

substantially engulfing the reticulated portions in a leady active material paste and sandwiching same between strips of paper which are substantially co-extensive with said reticulated portions;

drying the paper-bound pasted strip; and finally segmenting the pasted strip into individual battery plates.

3. A method of making lead-acid storage battery plates comprising:

advancing a narrow lead strip having a predetermined thickness longitudinally between two rows of progressive dies and cutters, said strip having a central, longitudinal lug-forming portion and two expandable grid-forming portions flanking the lug-forming portion and extending to both longitudinal edges of the strip, and said rows comprising a plurality of dies and cutters which converge in incremental steps on the central lug-forming portion of the strip passing between them;

expanding the grid-forming portions along the longitudinal edges thereof by periodically shearing rectangular wire-like segments from said edges into a plurality of tiers of undulatory skeletal elements extending at acute angles to the plane of said lug-forming portions and such that successive tiers are offset one from the other and joined to the other by a plurality of nodes which join the ends of successive segments in one tier to the centers of like segments in successive tiers, said nodes having rectangular, vertically transverse cross-sections and widths significantly greater than said predetermined thickness and equal to the sum of the widths of the adjoining skeletal elements, whereby two reticulated portions comprising a plurality of polygonal paste-retaining cells bounded by said skeletal elements and nodes are formed and extend at acute angles from the central portion in gull-wing fashion when viewed head-on;

leveling said strip by folding said reticulated portions down into nearly the same plane as said central portion;

advancing said reticulated portions longitudinally between coacting male and female stretching and forming rollers in which the male roller has alternate rows of aligned truncated pyramidal projections for engaging the cells and the female roller has a resilient surface layer having alternate rows of aligned recesses for receiving said projections and ridges between said recesses for pressing said skeletal elements and nodes toward the bases of said projections and uniformly stretch each tier in directions perpendicular to the direction the strip is fed through the rollers to substantially uniformly size the cells, stretch the reticulated portions to a predetermined width and slightly rotate the rectangular nodes such that diagonally opposed edges of the nodes becomes salient in the principal planes of the reticulated portions;

flattening the reticulated portions by further rotating said nodes and compressing said salient edges into plateaus and thereby convert the rectangular cross-sections of said nodes to polygonal cross-sections having two opposing sides thereof laying in planes substantially parallel to the faces of the pasted plate and spaced one from the other by a distance greater that said predetermined thickness but substanttially less than twice said predetermined thickness;

substantially engulfing the reticulated portitons in a leady active material paste and sandwiching same between strips of paper which are substantially co-extensive with said reticulated portions;

drying the paper-bound pasted strip; and finally segmenting the pasted strip into individual battery plates.

4. A method of making lead-acid storage battery plates comprising:

advancing a narrow lead strip, having a predetermined thickness, longitudinally between two rows of progressive dies and cutters, said strip having a central, longitudinal lug-forming portion and two expandable grid-forming portions flanking the lug-forming portion and extending to both longitudinal edges of the strip, and said rows comprising a plurality of dies and cutters which converge in incremental steps on the central lug-forming portion of the strip passing between them;

expanding the grid-forming portions along the longitudinal edges thereof by periodically shearing rectangular wire-like segments from said edges into a plurality of tiers of undulatory skeletal elements extending at acute angles to the plane of said lug-forming portions and such that successive tiers are offset one from the other and joined one to the other by a plurality of nodes which join the ends of successive segments in one tier to the centers of like segments in successive tiers, said nodes having rectangular, vertically transverse cross-sections and widths significantly greater than said predetermined thickness and equal to the sum of the widths of the adjoining skeletal elements, whereby two reticulated portions comprising a plurality of polygonal paste-retaining cells bounded by said skeletal elements and nodes are formed and extend at acute angles from the central portion in gull-wing fashion when viewed head-on;

leveling the thusly expanded strip by folding said reticulated portions down into nearly the same plane as said central portion;

uniformly stretching the reticulated portins in directions substantially perpendiculalr to the direction the strip is fed throught the dies by urging each tier of skeletal elements in those directions independently of the other tiers to uniformly size the cells, stretch the reticulated portions to a predetermined width and slightly rotate the rectangular nodes such that diagonally opposing edges of the nodes become salient in the principal planes of the reticulated portions;

flattening the reticulated portions by further rotating said nodes and compressing said salient edges into plateaus and thereby convert the rectangular cross-sections of said nodes to polygonal cross-sections having two opposing sides thereof laying in planes substantially parallel to the faces of the pasted plate and spaced one from the other by a distance greater than said predetermined thickness but substantially less than twice said predetermined thickness;

substantially engulfing the reticulated portions in a leady active material paste;

drying the pasted strip; and finally segmenting the pasted strip into individual battery plates.

5. A method of making lead-acid storage battery grid stock from strips of lead alloy comprising:

advancing a narrow strip of said lead alloy, having a predetermined thickness, longitudinally between two rows of progressive dies and cutters, said strip having a central, longitudinal lug-forming portion and two expandable grid-forming portions flanking the lug-forming portion and extending to both both longitudinal edges of the strip, and said rows comprising a plurality of dies and cutters which converge in incremental steps on the central lug-forming portion of the strip passing between them;

expanding the grid-forminng portions along the longitudinal edges thereof by periodically shearing rectangular wire-like segments from said edges into a plurality of tiers of undulatory skeletal elements extending at acute angles to the plane of said lug-forming portions and such that successive tiers are offset one from the other and joined one to the other by a plurality of nodes which join the ends of successive segments in one tier to the centers of like segments in successive tiers, said nodes having rectangular, vertically transverse cross-sections and widths significantly greater than said predetermined thickness and equal to the sum of the widths of the adjoining skeletal elements, whereby two reticulated portions comprising a plurality of polygonal paste-retaining cells bounded by said skeletal elements and nodes are formed and extend at acute angles from the central portion in gull-wing fashion when viewed head-on;

leveling the thusly expanded strip by folding said reticulated portions down into nearly the same plane as said central portion;

uniformly stretching the reticulated portions in directions substantially perpendicular to the direction the strip is fed through the dies by urging each tier of skeletal elements in those directions independently of the other tiers to uniformly size the cells, stretch the reticulated portions to a predetemined width and slightly rotate the rectangular nodes such that diagonally opposing edges of the nodes become salient in the principal planes of the reticulated portions; and flattening the reticulated portions by further rotating said nodes and compressing said salient edges into plateaus and thereby convert the rectangular cross-sections of said nodes to polygonal cross-sections having two opposing sides thereof laying in planes substantially parallel to the faces of said central portions and spaced one from the other by a distance greater than said predetermined thickness but substantially less than twice said predetermined thickness.

* * * * *

UNITED STATES PATENT OFFICE
CERTIFICATE OF CORRECTION

Patent No. 3,853,626          Dated December 10, 1974

Inventor(s) Elon Daniels, Jr. & Richard H. Kline

It is certified that error appears in the above-identified patent and that said Letters Patent are hereby corrected as shown below:

In the Abstract, line 17, "expanded" should be -- expander --.

In the Specification, column 3, line 65, "strected" should be -- stretched --. Column 4, line 23, "alone" should be -- along --; line 58, "with" should be -- With --. Column 5, line 44, "undesireably" should be -- undesirably --. Column 8, line 13, "19" should be -- 10 --; line 52, "botton" should be -- bottom --; line 56, "cultaion" should be -- culation --. Column 10, line 17, "acitve" should be -- active --; line 46, "node" should be -- nodes --. Column 11, line 11, "substanntially" should be -- substantially --. Column 12, line 15, "stanttially" should be -- stantially --; line 17, "poritons" should be -- portions --; line 58, "portins" should be -- portions --. Column 13, line 23, "extending to both both" should be -- extending to both --; line 28, "forminng" should be -- forming --.

Signed and Sealed this tenth Day of February 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,853,626      Dated December 10, 1974

Inventor(s) Elon Daniels, Jr. et al

It is certified that error appears in the above-identified patent and that said Letters Patent are hereby corrected as shown below:

Figures 2, 3, 4 and 5 should appear as shown below:

Signed and Sealed this fifteenth Day of June 1976

[SEAL]

Attest:

RUTH C. MASON
*Attesting Officer*

C. MARSHALL DANN
*Commissioner of Patents and Trademarks*